United States Patent [19]

Gavin

[11] Patent Number: 5,509,953
[45] Date of Patent: Apr. 23, 1996

[54] SPINNER FOR MANUFACTURING DUAL-COMPONENT FIBERS

[75] Inventor: Patrick M. Gavin, Newark, Ohio

[73] Assignee: Owens-Corning Fiberglas Technology, Inc., Summit, Ill.

[21] Appl. No.: 236,062

[22] Filed: May 2, 1994

[51] Int. Cl.⁶ .................................................. C03B 37/073
[52] U.S. Cl. ................................ 65/502; 65/504; 65/521; 475/131.1; 475/130; 475/217; 264/168; 264/DIG. 26; 264/172.18
[58] Field of Search .............................. 65/502, 504, 516, 65/521, 438, 459, 470; 264/211.1, DIG. 26, DIG. 29, 168, 174; 425/131.1, 130, 217

[56] References Cited

U.S. PATENT DOCUMENTS

| | | |
|---|---|---|
| 2,927,621 | 3/1960 | Slayter et al. . |
| 2,998,620 | 9/1961 | Stalego . |
| 3,073,005 | 1/1963 | Tiede . |
| 3,190,736 | 6/1965 | Benner . |
| 3,245,768 | 4/1966 | Simmers . |
| 3,381,074 | 5/1968 | Bryan ..................................... 264/168 |
| 5,277,955 | 1/1994 | Schelhorn et al. . |

Primary Examiner—John M. Hoffmann
Attorney, Agent, or Firm—C. Michael Gegenheimer; Ted C. Gillespie

[57] ABSTRACT

An apparatus for making dual component fibers is provided and includes a spinner having peripheral and bottom walls. The spinner includes orifices located on the peripheral wall thereof for centrifuging the dual component fibers, with the spinner being divided into a series of generally vertically-aligned compartments by baffles positioned circumferentially around the interior of the peripheral wall. A first divider is provided in the spinner for directing the first molten thermoplastic material into alternate ones of the compartments, and a second divider is provided for directing the second molten thermoplastic material into the remaining ones of the compartments so that adjacent compartments contain different thermoplastic materials. Passages are located in each of the compartments through which the respective molten thermoplastic materials flow to the orifices on the peripheral wall of the spinner.

25 Claims, 4 Drawing Sheets

SPINNER FOR MANUFACTURING DUAL-COMPONENT FIBERS

BACKGROUND OF THE INVENTION

This invention relates to an apparatus for manufacturing dual component fibers from thermoplastic materials, and more particularly to a spinner apparatus for centrifuging dual component fibers from two streams of molten thermoplastic materials such as glass or other mineral fibers or polymer fibers.

Fibers of glass and other thermoplastic materials are useful in a variety of applications including acoustical or thermal insulation materials. Common prior art methods for producing glass fiber insulation products involve producing glass fibers from a rotary process. A single molten glass composition is forced through the orifices in the outer wall of a centrifuge commonly known as a spinner, producing primarily short, straight glass fibers.

The temperatures of molten glasses used in rotary fiberizing processes may exceed 2000° F. (1093° C.). Because of the high temperatures involved and the high rotational speeds of the spinners, the materials of construction for such devices present many demands on those materials to withstand those conditions. Corrosion resistance is also required so that the orifices in the spinner maintain their designed size and shape.

A modification of conventional glass fibers, which are usually straight fibers, is the use of fibers which are curly (helical) in shape. These fibers can be made by joining two distinct glass streams, commonly referred to as the A glass and B glass streams, and centrifuging the dual glass stream into a curly (helical) fiber.

Stalego, U.S. Pat. No. 2,998,620, discloses curly (helical) glass fibers of bicomponent glass compositions. Stalego discloses producing staple curly fibers by passing two glass compositions having differing coefficients of thermal expansion through the orifices of a spinner. The glasses are extruded as a dual glass stream in aligned integral relationship such that the fibers curl naturally upon cooling due to the differences in their coefficients of thermal expansion. Stalego discloses in one embodiment a spinner having vertically aligned compartments separated by vertical baffles around the periphery of the spinner, with alternate compartments containing the different glasses. The patentee teaches that an orifice wider than the baffle is to be drilled where the baffle intersects the spinner peripheral wall. As the orifice is wider than the baffle, the orifice is in communication with both of the vertical compartments on either side of the baffle, and both the A glass and B glass will exit the spinner from the orifice, forming a dual glass stream.

However, there remains a need in this art for improving the delivery of dual streams of molten glasses to form dual glass or other thermoplastic fibers.

SUMMARY OF THE INVENTION

This need is met by the present invention in which a series of orifices are positioned in the spinner peripheral wall which are fed with different molten thermoplastic materials by passages from adjacent compartments to form dual component fibers. The present invention also provides for feeding of the different molten thermoplastic materials from the top and bottom of the spinner to provide improved temperature control (i.e., more even temperature distribution) within the spinner. Further, the placement and sizing of the passages and orifices in the spinner provides a build up of molten thermoplastic materials in the adjacent compartments and prevents air from entering into those compartments. For purposes of this patent specification, in using the terms "glass fibers" and "glass compositions" "glass" is intended to include any of the glassy forms of materials such as rock, slag, and basalt, as well as traditional glasses. Thermoplastic materials and thermoplastic fibers include, in addition to glass and other mineral fibers, fibers from polymer materials such as polyester fibers and polypropylene fibers.

In accordance with one aspect of the present invention, an apparatus for making dual component fibers is provided and includes a spinner having peripheral and bottom walls. The spinner includes orifices located on the peripheral wall thereof for centrifuging the dual component fibers, with the spinner being divided into a series of generally vertically-aligned compartments by baffles positioned circumferentially around the interior of the peripheral wall.

The first and second molten thermoplastic materials are supplied to the spinner by any suitable equipment. For example, if the materials are glasses, the equipment will include melting furnaces and forehearths to supply the two molten glasses. A first divider is provided in the spinner for directing the first molten thermoplastic material against the peripheral wall of the spinner and into alternate ones of the compartments, and a second divider is provided for directing the second molten thermoplastic material against the peripheral wall of the spinner and into the remaining ones of the compartments so that adjacent compartments contain different thermoplastic materials. Passages are located in each of the compartments through which the respective molten thermoplastic materials flow to the orifices on the peripheral wall of the spinner.

In a preferred form of the invention, the passages in adjacent ones of the compartments communicate with one another and with the orifices to join the first and second molten thermoplastic materials together into dual component fibers. Preferably, the orifices are in alignment with the baffles.

To provide dual component fibers with substantially equal proportions of the first and second thermoplastic materials, the passages in adjacent compartments are of substantially the same diameter and length. Moreover, the passages are sized so that there is a build up of molten thermoplastic materials in the compartments covering the passages.

The first divider in the spinner includes a generally horizontal annular plate which is preferably positioned on the top edges of the generally vertically-aligned baffles and abuts the inner side of the peripheral wall of the spinner. The plate includes a series of orifices which are spaced around its circumference and which provide access to alternate ones of the compartments for the first molten thermoplastic material.

Preferably, the spinner also includes a flange which extends generally upwardly and inwardly from the top of the peripheral wall of the spinner. First molten thermoplastic material will flow, under the influence of centrifugal force, outwardly along the surface of the plate to the inner surface of the spinner peripheral wall where it will build up against that inner surface and beneath the flange. The first molten thermoplastic material will then flow through the orifices in the plate and into alternate ones of the compartments. Preferably, the orifices are sized and positioned so that they become completely covered by the build up of molten thermoplastic material. This prevents the entry of air into those compartments.

The second divider in the spinner includes a generally horizontal annular plate which is preferably positioned on the bottom edges of the generally vertically-aligned baffles and abuts the inner side of the peripheral wall of the spinner. The plate includes a series of orifices which are spaced around the circumference of the plate and which provide access to alternate ones of the compartments for the second molten thermoplastic material. Second molten thermoplastic material will flow, under the influence of centrifugal forces, outwardly along the bottom wall of the spinner to the inner surface of the spinner peripheral wall where it will build up against that inner surface and beneath the plate. The second molten thermoplastic material will then flow through the orifices in the plate and into the remaining ones of the compartments. Again, preferably, the orifices are sized and positioned so that they become completely covered by the build up of molten thermoplastic material. This prevents the entry of air into those compartments.

In a preferred embodiment of the invention, the thermoplastic materials are glasses, and the spinner is adapted to receive two separate molten glass streams for fiberization into dual glass fibers.

Accordingly, it is a feature of the present invention to provide a series of orifices positioned in a spinner peripheral wall which are fed with different molten thermoplastic materials by passages from adjacent compartments to form dual component fibers. It is another feature of the invention to provide feeding of the different molten thermoplastic materials from the top and bottom of the spinner to provide improved temperature control within the spinner. It is a further feature of the present invention to provide the placement and sizing of the passages and orifices in the spinner such that a build up of molten thermoplastic materials in the adjacent compartments occurs which prevents air from entering into those compartments. These, and other features and advantages of the present invention will become apparent from the following detailed description, the accompanying drawings, and the appended claims.

DETAILED DESCRIPTION OF THE PREFERRED EMBODIMENTS

The invention will be described in terms of apparatus for making irregularly-shaped dual glass fibers (i.e., the fibers are not straight in their axial orientation), although it is to be understood that the invention encompasses apparatus for making not only other types of dual glass fibers such as curly (helical) fibers, but also dual component fibers of other thermoplastic materials such as polyester or polypropylene.

Figure 1:
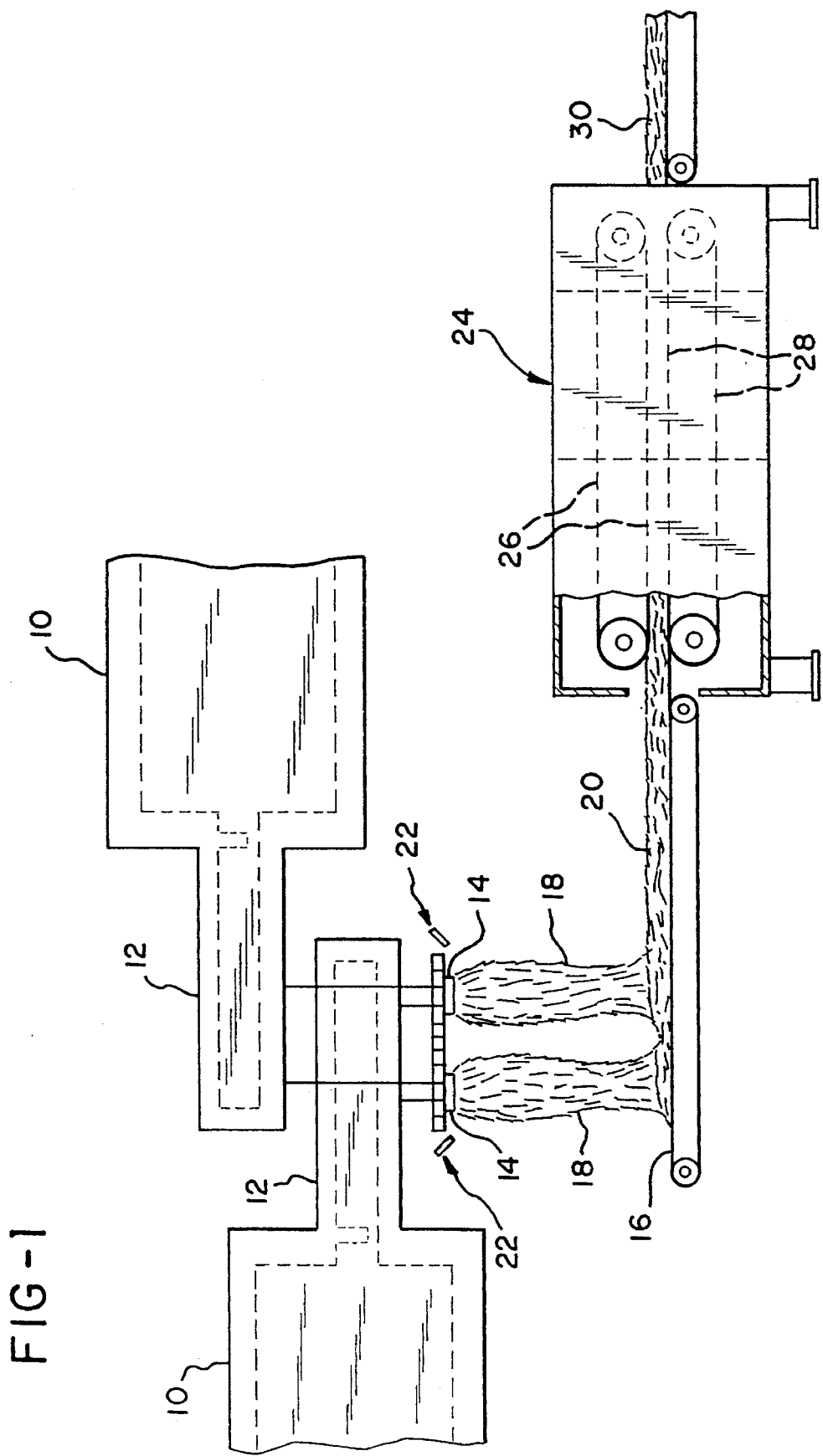
FIG. 1 is a schematic view in elevation of apparatus for making dual component fibers in accordance with the present invention.

The insulation products of irregularly-shaped glass fibers may be produced from a rotary fiber forming and pack heat setting process as shown in FIG. 1. Two distinct molten glass compositions (A glass and B glass) are supplied from any suitable source of glass such as furnaces 10 and forehearths 12 to rotary fiberizers 14. Preferably, the glasses have differing coefficients of thermal expansion so that upon cooling, they will assume an irregular (as opposed to straight) configuration. Veils 18 of dual glass fibers, such as irregularly-shaped glass fibers produced by the fiberizers 14, are collected on conveyor 16 as wool pack 20 by means of a vacuum positioned beneath the conveyor (not shown). As the fibers are blown downwardly by air or gases to conveyor 16 by means of blowers 22 adjacent the fiberizers, they are attenuated, cool, and attain their irregular shape.

The wool pack 20 may then optionally be passed through oven 24 at heat setting temperatures of from about 700° to 1000° F. (371° to 593° C.). The heat setting temperature may be achieved either by retarding the fiber cooling process after fiber forming to retain some of the heat from the fiber forming process, or by reheating the fibers in heat setting oven 24. While passing through the oven, wool pack 20 is shaped by top conveyor 26 and bottom conveyor 28, and by edge guides (not shown). While in oven 24, the glass fibers may be subjected to flows of hot gases to facilitate uniform heating. When the fibers are constrained by conveyors 26 and 28, the fibers are stressed in the manner of a compressed spring. When subjected to heat setting temperatures, the fibers relax, reducing stress, so that the wool pack holds its desired shape. After a period of up to 10 minutes, the wool pack then exits oven 24 as insulation product 30.

It is to be understood that heat setting is an optional aspect of the present invention. Alternatively, the wool pack may be encapsulated with an exterior plastic layer as taught by Schelhorn et al, U.S. Pat. No. 5,277,955, the disclosure of which is hereby incorporated by reference. Further, the wool pack may be subjected to other fabrication techniques including stitching, needling, or hydro-entanglement.

Figure 2:
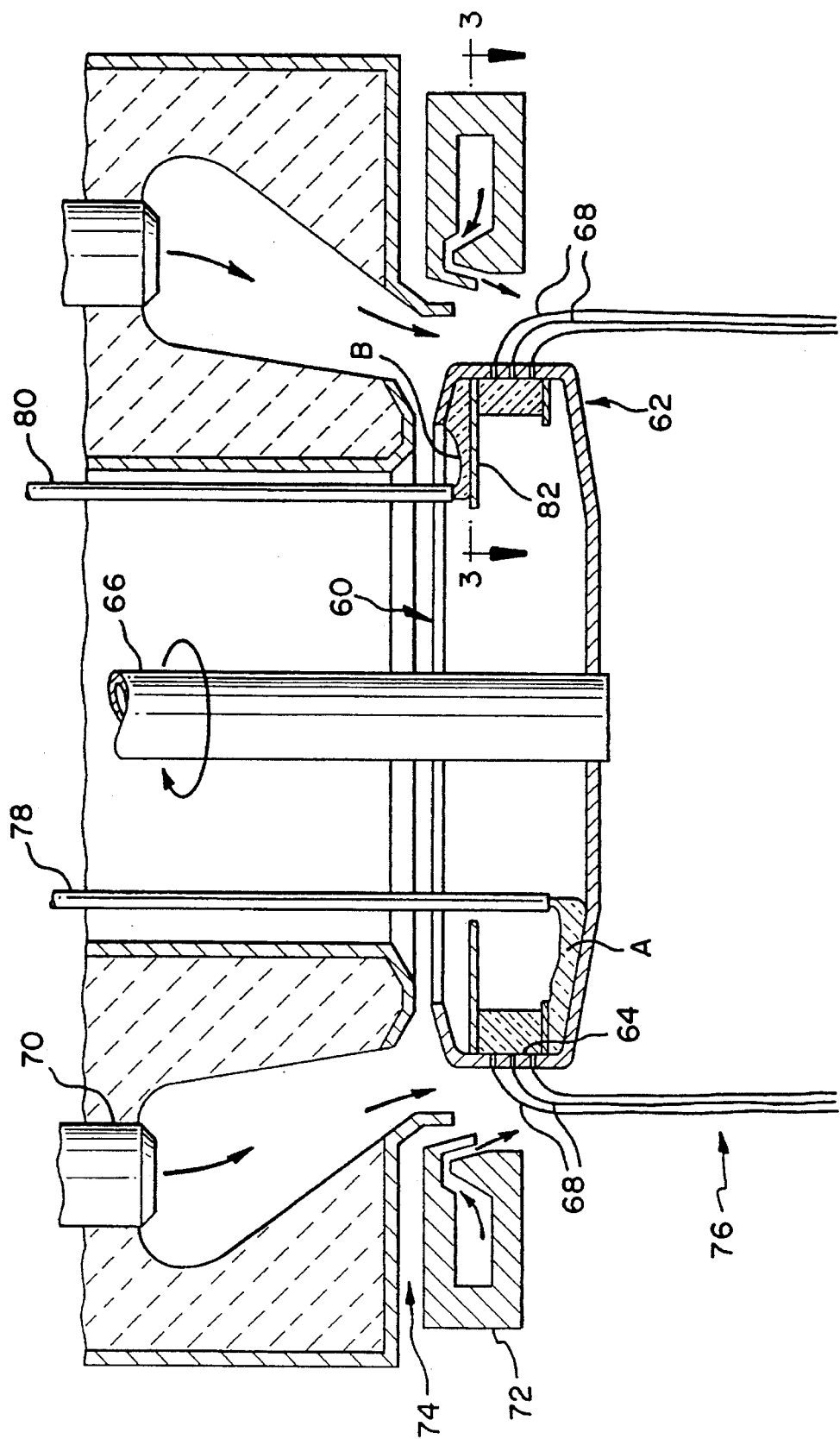
FIG. 2 is a cross-sectional view in elevation of the fiberizer/spinner used in the practice of the invention.

As shown in FIG. 2, spinner 60 includes a spinner bottom wall 62 and a spinner peripheral wall 64. While bottom wall 62 is illustrated as being closed, it will be appreciated that bottom wall 62 can be open so long as it has a sufficient surface to catch and direct the flow of glass A as shown. The spinner is rotated on spindle 66, as is known in the art. The rotation of the spinner centrifuges molten glass through orifices in spinner peripheral wall 64 to form primary fibers 68. The primary fibers 68 are maintained in a soft, attenuable condition by the heat of annular burner 70. An internal burner (not shown) may also be used to provide heat to the interior of spinner 60. Annular blower 72, using induced air through passage 74, is positioned to pull primary fibers 68 and further attenuate them into secondary dual-glass fibers 76, suitable for use in wool insulating materials. The dual-glass irregularly-shaped glass fibers are then collected on a conveyor (as shown in FIG. 1) for formation into a wool pack.

The interior of spinner 60 is supplied with two separate streams of molten glass, first stream 78 containing glass A and second stream 80 containing glass B. The glass in stream 78 drops directly onto spinner bottom wall 62 and flows outwardly due to the centrifugal force toward spinner peripheral wall 64 to form a head of glass A beneath annular horizontal plate 81 as shown. Glass B in molten glass stream 80 is positioned closer to spinner peripheral wall 64 than stream 78, and the B glass in stream 80 is intercepted by an annular horizontal plate 82 before it can reach the spinner bottom wall. Thus, a build-up or head of glass B is formed above horizontal plate 82 as shown.

Figure 3:
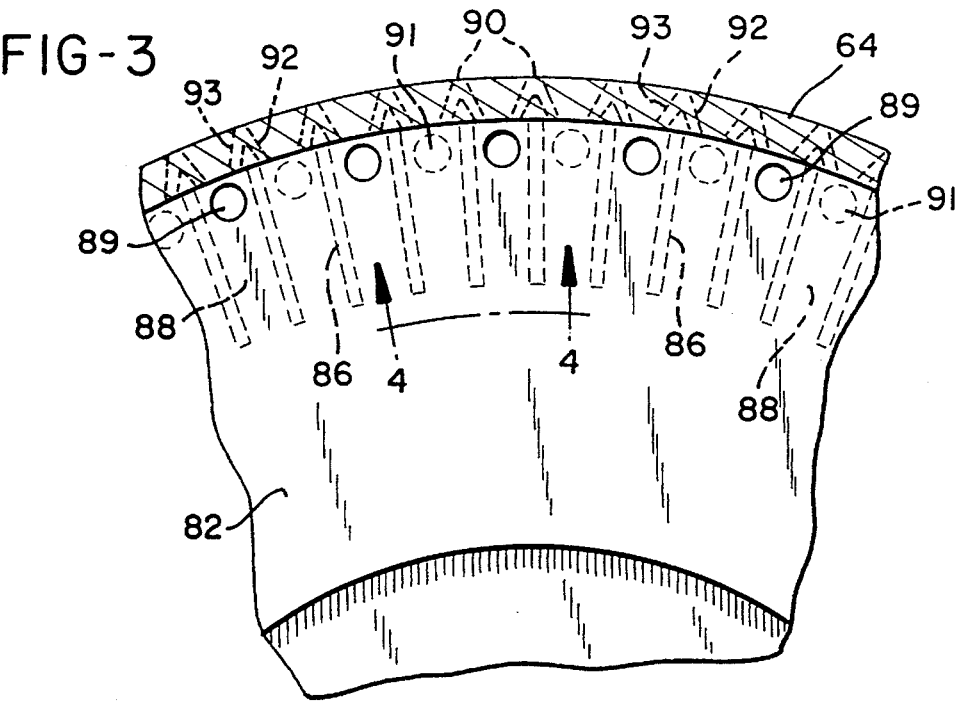
FIG. 3 is a plan view, partly in section, of a portion of the spinner taken along line 3—3 of FIG. 2.
Figure 5:
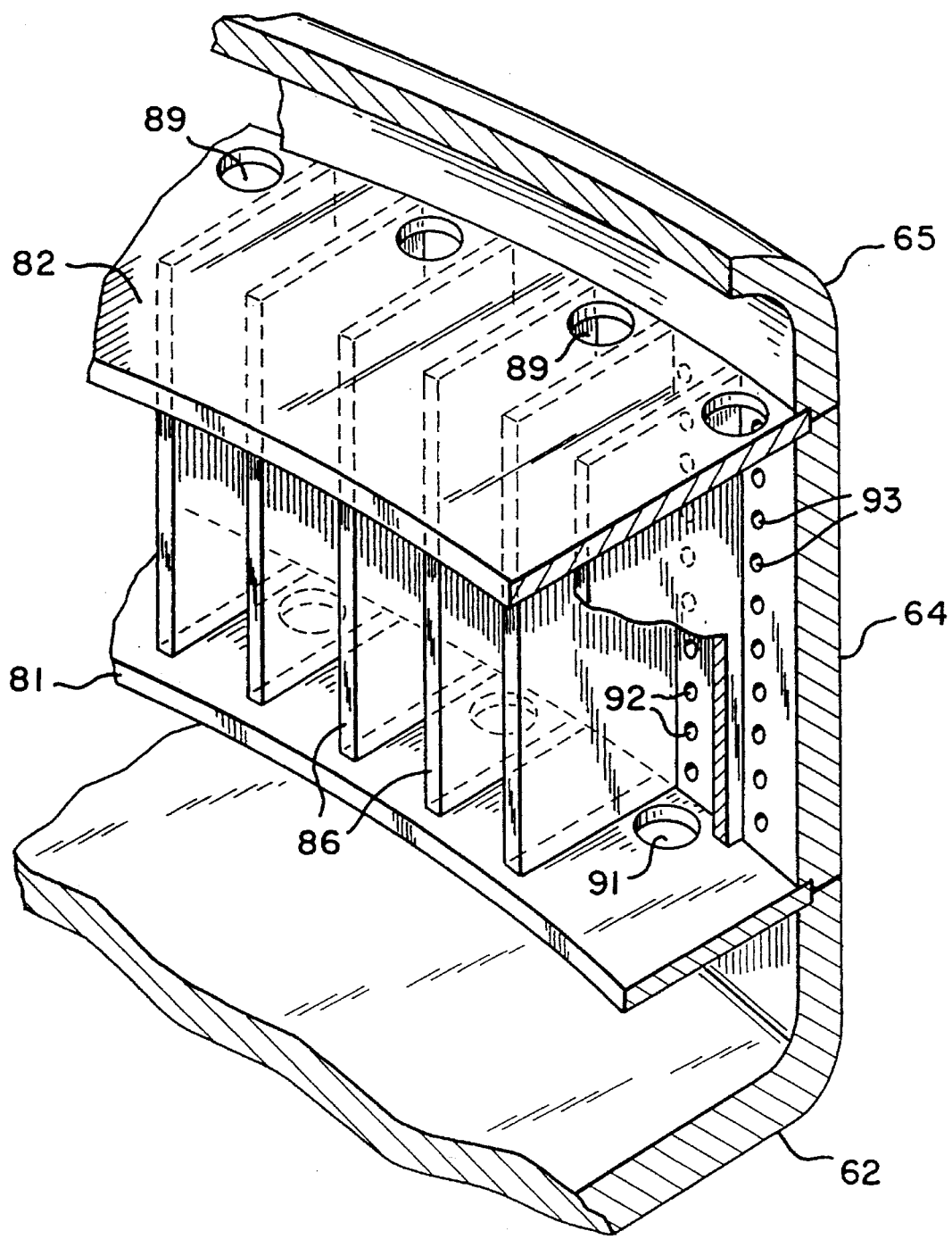
FIG. 5 is a perspective view taken from the interior of the spinner showing the dividers and compartments for the A and B components.

As best shown in FIGS. 3 and 5, the spinner 60 is adapted with a series of vertical baffles 86 which are positioned along spinner peripheral wall 64 to divide that space into a series of generally vertically-aligned compartments 88 positioned between horizontal plates 81 and 82, with plate 82 positioned on the top edges of baffles 86 and plate 81 positioned against the bottom edges of those baffles.

Access to the compartments 88 is provided by a series of orifices 89 and 91, respectively, on horizontal plates 81 and 82. As shown, orifices 89 in plate 82 are spaced about the periphery of the plate to provide access into alternating ones of compartments 88. Likewise, orifices 91 are spaced about the periphery of plate 81 to provide access into the remaining ones of the compartments such that the A and B glasses are in alternating ones of the compartments. While the spinner is illustrated as having one orifice 89 or 91 per compartment, it will be recognized that a greater number of orifices per compartment may be provided, respectively, on plates 81 and 82. For example, a plurality of orifices could be made along radial lines outwardly along plates 81 and 82 in alignment with compartments 88.

In operation, molten B glass from stream 80 drops onto horizontal plate 82 and is centrifuged outwardly against spinner peripheral wall 64 and flange 65 which extends upwardly and inwardly from spinner wall 64 (FIG. 5). The molten glass then passes through orifices 89 and fills alternating ones of compartments 88. Molten A glass from stream 78 drops directly onto spinner bottom wall 62 and is centrifuged outwardly against spinner peripheral wall 64 and beneath horizontal plate 81. The build up of molten glass there forces glass into the remaining compartments 88 through orifices 91. Because of the counter flow of molten glasses (B glass flowing downwardly into the compartments and A glass flowing upwardly), temperature control and distribution within the spinner and along the spinner peripheral wall is improved. That is, temperature distribution along the face of spinner wall 64 will be more uniform because of the counter flow of the glasses.

In the embodiment shown, spinner peripheral wall 64 has orifices 90 located thereon. Orifices 90 are positioned adjacent to, and in general alignment with, the radial outward edges of the vertical baffles 86. As can been seen in FIGS. 4 and 5, a series of passages 92 and 93 are located in each of the compartments 88 through which molten thermoplastic material will flow. Preferably, these passages are located adjacent either side of baffles 86 and are angled to communicate one another and with orifices 90 on the outer surface or peripheral wall 64.

Alternatively, the orifices 90 may be formed as elongated slots in alignment with baffles 86. By making the slots wider than the width of those baffles, A and B glasses will be centrifuged out of the slots together as taught in commonly assigned, copending application Ser. No. 08/147,762, filed Nov. 5, 1993, and entitled APPARATUS FOR MAKING DUAL-GLASS FIBERS, the disclosure of which is incorporated by reference.

Figure 4:
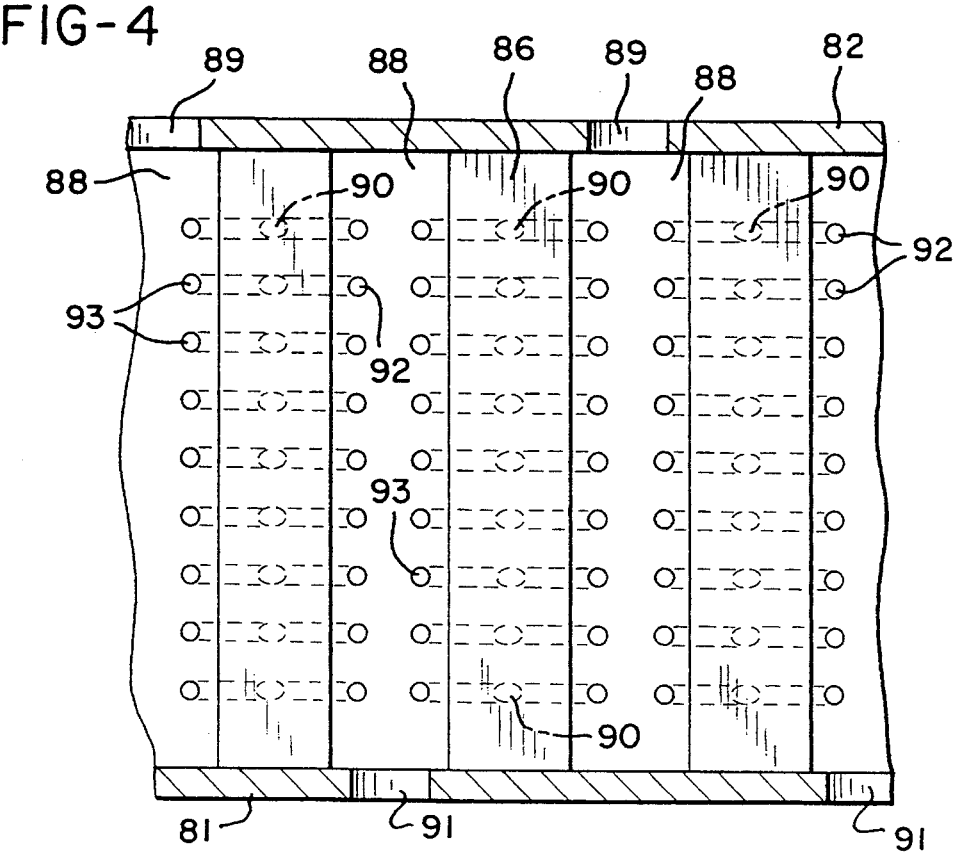
FIG. 4 is a schematic partial view, taken in elevation, of the spinner taken along line 4—4 of FIG. 3.

As shown in FIGS. 3 and 4, the passages 92 and 93 are generally vertically aligned and are preferably sized to provide equal flow lengths for the A and B glass components in adjacent compartments 88. This ensures that when the A and B components exit orifices 90 in side-by-side relation, there will be approximately equal amounts of A and B glasses for each fiber. It will be recognized that if unequal amounts of A and B glasses are desired, the passages 92 and 93 may be sized to provide for unequal amounts of flow resulting in unequal proportions in the dual component fiber. Such a result may be desirable in certain instances. Additionally, the passages in each compartment may vary in size to provide a variation in the ratios of A and B glasses in the dual component fibers formed.

Typically, passages 92 and 93 will have diameters in the range of from about 0.010 to about 0.040 inches (0.25 to about 1.0 mm), and preferably from about 0.015 to about 0.025 inches (0.38 to about 0.63 mm). The number of passages formed depends on the height of the spinner peripheral wall. The number and size of the passages, as well as the flow rate of the molten glasses into compartments 88 through orifices 89 and 91 is chosen to build up a "head" of molten material covering orifices 89 and 91 as well as the passages in each compartment. By maintaining the volume of build up or "head" of molten thermoplastic material somewhat larger above and beneath the compartments 88 than within compartments 88 and against peripheral wall 64, there will be a sufficient pressure differential to force the molten material to flow through orifices 89 and 91 and into the compartments. Orifices 90, and passages 92 and 93 may be drilled into the spinner wall by any of several known drilling techniques such as laser drilling, electronic discharge milling (EDM), or electron beam drilling.

As shown in FIG. 5, spinner bottom wall 62, spinner peripheral wall 64, and flange 65 made be fabricated separately and then assembled. This permits orifices 90 and passages 92, 93 in the spinner peripheral wall to be drilled prior to assembly, and makes overall manufacture of the spinner less complex. Additionally, the spinner bottom, peripheral wall, and flange may be fabricated of different materials which are most suitable for their particular use. Thus, spinner bottom wall 62 and flange 65 may be fabricated from a metal or alloy providing high structural strength and resistance to creep such as oxide dispersion strengthened alloys (ODS) to provide a strong and stable rotary device. Spinner peripheral wall 64 may be fabricated from a different metal or alloy which provides high corrosion resistance such as a cobalt/chromium/nickel superalloy, to withstand corrosive effects from the flow of molten thermoplastic materials through the passages in the spinner wall and to maintain the proper orifice dimensions.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

I claim:

1. Apparatus for making dual component fibers comprising:

a) a spinner having a peripheral wall with an internal surface and an external surface and a bottom wall, and further including orifices located in said peripheral wall for centrifuging dual component fibers, said spinner being divided into a series of compartments by baffles positioned interiorly of said peripheral wall;

b) equipment for supplying first and second molten thermoplastic materials to said spinner;

c) a first divider for directing said first molten thermoplastic materials against said peripheral wall and into alternate ones of said compartments, said first divider including a first plate abutting said peripheral wall and having a series of first orifices therein spaced to provide access for said first molten material to flow into said alternate ones of said compartments and a second divider for directing said second molten thermoplastic materials against said peripheral wall and into remaining ones of said compartments, said second divider including a second plate abutting said peripheral wall and having a series of second orifices therein spaced to provide access for said second molten material to flow into said remaining ones of said compartments; and d) passages extending through said peripheral wall and communicating with said compartments and said orifices in said peripheral wall so as to permit flow of said first and second materials from said compartments to said orifices in said peripheral wall of said spinner.

2. An apparatus as claimed in claim 1 in which pairs of adjacent ones of said passages extend through said peripheral wall and from adjacent ones of said compartments such that adjacent passages of each pair are angled relative to one another to communicate with one another and with one of said orifices in said peripheral wall.

3. An apparatus as claimed in claim 1 in which said orifices in said peripheral wall are in alignment with said baffles.

4. An apparatus as claimed in claim 1 in which said passages are sized to provide a build up of said molten thermoplastic materials in said compartments.

5. An apparatus as claimed in claim 1 in which all of said passages communicating with said compartments are of substantially equal diameters and equal lengths.

6. An apparatus as claimed in claim 1 including a flange extending generally upwardly from said peripheral wall and towards an axis of rotation of said spinner.

7. An apparatus as claimed in claim 1 in which said first plate is generally horizontal anal positioned on top edges of said baffles.

8. An apparatus as claimed in claim 7 including a flange extending generally upwardly from said peripheral wall and towards an axis of rotation of said spinner, and in which said first orifices are sized to provide a build up of said first molten thermoplastic material against said peripheral side wall, said first plate and said flange.

9. An apparatus as claimed in claim 1 in which said second plate is generally horizontal and positioned in contact with bottom edges of said baffles.

10. An apparatus as claimed in claim 9 in which said second orifices are sized to provide a build up of said second molten thermoplastic material against said peripheral wall said bottom wall and said second plate.

11. Apparatus for making dual glass fibers comprising:

a) a spinner having a peripheral wall with an internal surface and an external surface and a bottom wall, and further including orifices located in said peripheral wall for centrifuging dual component fibers, said spinner being divided into a series of compartments by baffles positioned interiorly of said peripheral wall;

b) equipment for supplying first and second molten glasses to said spinner;

c) a first divider for directing said first molten glass against said peripheral wall and into alternate ones of said compartments and a second divider for directing said second molten glass against said peripheral wall and into remaining ones of said compartments; and d) a plurality of passage pairs extending through said peripheral wall wherein each, of said passage pairs includes first and second passages which are angled relative to one another to communicate with one another and with a selected one of said orifices, said first passage communicates with a first compartment so as to permit flow of said first molten glass to said selected orifice and said second passage communicates with a compartment so as to permit flow of a second molten glass to said selected orifice.

12. An apparatus as claimed in claim 11 in which said first and second passages of each passage pair extend from adjacent ones of said compartments.

13. An apparatus as claimed in claim 12 in which all of said passages are of substantially equal diameters and equal lengths.

14. An apparatus as claimed in claim 11 in which said orifices are in alignment with said baffles.

15. An apparatus as claimed in claim 11 in which said passages are sized to provide a build up of said molten glasses in said compartments.

16. An apparatus as claimed in claim 11 including a flange extending generally upwardly from said peripheral wall and towards an axis of rotation of said spinner.

17. An apparatus as claimed in claim 11 in which said first divider includes a generally horizontal plate positioned on top edges of said baffles and abutting said peripheral wall of said spinner, said plate includes a series of orifices therein spaced to provide access for said first molten glass to flow into the alternate ones or said compartments.

18. An apparatus as claimed in claim 17 including a flange extending generally upwardly from said peripheral wall and towards an axis of rotation of said spinner, and in which said orifices included in said plate are sized to provide a build up of said first molten glass against said peripheral wall, said horizontal plate and said flange.

19. An apparatus as claimed in claim 11 in which said second divider includes a generally horizontal plate positioned in contact with bottom edges of said baffles and abutting said peripheral wall of said spinner, said plate includes a series of orifices therein spaced to provide access for said second molten glass to flow into the remaining ones or said compartments.

20. An apparatus as claimed in claim 19 in which said orifices included in said plate are sized to provide a build up of said second molten glass against said peripheral wall, said bottom wall and said horizontal plate.

21. Apparatus for making dual glass fibers comprising:

a) a spinner having a peripheral wall with an internal surface and an external surface and a bottom wall, and further including orifices located in said peripheral wall for centrifuging dual component fibers, said spinner being divided into a series of compartments by baffles positioned interiorly of said peripheral wall;

b) equipment for supplying first and second molten glasses to said spinner;

c) a first divider for directing said first molten glass into alternate ones of said compartments, said first divider including a first generally horizontal plate positioned along the tops of said baffles and abutting said peripheral wall of said spinner, said first plate including a series of first orifices therein spaced to provide access for said first molten glass to flow into said alternate ones of said compartments; and a second divider for directing said second molten glass into remaining ones of said compartments, said second divider including a second generally horizontal plate positioned along the bottoms of said baffles and abutting said peripheral wall of said spinner, said second plate including a series of second orifices therein spaced to provide access for said second molten glass to flow into said remaining ones of said compartments; and d) passages extending through said peripheral wall and communicating with said compartments and said orifices in said peripheral wall through which said molten glasses flow to said orifices in said peripheral wall of said spinner.

22. Apparatus for making dual component fibers comprising:
   a) a spinner having a peripheral wall with an internal surface and an external surface and a bottom wall, and further including orifices located in said peripheral wall for centrifuging dual component fibers, said spinner being divided into a series of compartments by baffles positioned interiorly of said peripheral wall;
   b) equipment for supplying first and second molten thermoplastic materials to said spinner;
   c) a first divider for directing said first molten thermoplastic materials against said peripheral wall and into alternate ones of said compartments, said first divider including a generally horizontal first plate having a series of fist orifices therein spaced to provide access for said first molten material to flow into alternate ones of said compartments and a second divider for directing said second molten thermoplastic materials against said peripheral wall and into remaining ones of said compartments, said second divider including a generally horizontal second plate having a series of second orifices therein spaced to provide access for said second molten material to flow into the remaining ones of said compartments; and
   d) passages extending through said peripheral wall and communicating with said compartments and said orifices in said peripheral wall so as to permit flow of said first and second materials from said compartments to said orifices in said peripheral wall of said spinner.

23. Apparatus for making dual component fibers comprising:
   a) a spinner having a peripheral wall with an internal surface and an external surface and a bottom wall, and further including orifices located in said peripheral wall for centrifuging dual component fibers, said spinner being divided into a series of compartments by baffles positioned interiorly of said peripheral wall;
   b) equipment for supplying first and second molten thermoplastic materials to said spinner;
   c) a first divider for directing said first molten thermoplastic materials against said peripheral wall and into alternate ones of said compartments, said first divider including a first plate positioned along the tops of said baffles and having a series of first orifices therein spaced to provide access for said first molten material to flow into said alternate ones of said compartments and a second divider for directing said second molten thermoplastic materials against said peripheral wall and into remaining ones of said compartments, said second divider including a second plate positioned along the bottoms of said baffles and having a series of second orifices therein spaced to provide access for said second molten material to flow into said remaining ones of said compartments; and
   d) passages extending through said peripheral wall and communicating with said compartments and said orifices in said peripheral wall so as to permit flow of said first and second materials from said compartments to said orifices in said peripheral wall of said spinner.

24. An apparatus as claimed in claim 23 in which said first plate is generally horizontal and abuts said peripheral wall of said spinner.

25. An apparatus as claimed in claim 23 in which said second plate is generally horizontal and abuts said peripheral wall of said spinner.

* * * * *